(12) United States Patent
Lesso

(10) Patent No.: US 11,551,075 B2
(45) Date of Patent: Jan. 10, 2023

(54) ARTIFICIAL NEURAL NETWORKS

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 359 days.

(21) Appl. No.: 16/820,921

(22) Filed: Mar. 17, 2020

(65) Prior Publication Data

US 2020/0311534 A1 Oct. 1, 2020

Related U.S. Application Data

(60) Provisional application No. 62/825,197, filed on Mar. 28, 2019.

(51) Int. Cl.
| | |
|---|---|
| *G06N 3/063* | (2006.01) |
| *G06N 3/04* | (2006.01) |
| *G06F 17/16* | (2006.01) |
| *G06F 7/523* | (2006.01) |
| *G06F 7/544* | (2006.01) |

(52) U.S. Cl.
CPC .......... *G06N 3/0635* (2013.01); *G06F 7/523* (2013.01); *G06F 7/5443* (2013.01); *G06F 17/16* (2013.01); *G06N 3/0481* (2013.01)

(58) Field of Classification Search
CPC .... G06N 3/0635; G06N 3/0481; G06F 17/16; G06F 7/523; G06F 7/5443; G06F 2207/4824
USPC .......................................................... 706/38
See application file for complete search history.

(56) References Cited

U.S. PATENT DOCUMENTS

| | | | |
|---|---|---|---|
| 11,295,200 B1* | 4/2022 | Ko | ........................... G06F 17/10 |
| 2020/0005125 A1* | 1/2020 | Venkataramani | .... G06N 3/0481 |
| 2020/0250483 A1* | 8/2020 | Masse | .................... G06V 10/82 |

* cited by examiner

*Primary Examiner* — Tan V Mai
(74) *Attorney, Agent, or Firm* — Jackson Walker L.L.P.

(57) ABSTRACT

The present disclosure relates to a neuron for an artificial neural network. The neuron includes: a first dot product engine operative to: receive a first set of weights; receive a set of inputs; and calculate the dot product of the set of inputs and the first set of weights to generate a first dot product engine output. The neuron further includes a second dot product engine operative to: receive a second set of weights; receive an input based on the first dot product engine output; and generate a second dot product engine output based on the product of the first dot product engine output and a weight of the second set of weights. The neuron further includes an activation function module arranged to generate a neuron output based on the second dot product engine output. The first dot product engine and the second dot product engine are structurally or functionally different.

20 Claims, 12 Drawing Sheets

ARTIFICIAL NEURAL NETWORKS

FIELD OF THE INVENTION

The present disclosure relates to the field of artificial neural networks.

BACKGROUND

In simplistic terms, an artificial neural network includes an input layer of nodes or neurons, an output layer of nodes or neurons and, optionally, one or more layers (often referred to as "hidden layers") of nodes or neurons intermediate the input layer and the output layer. Each layer is connected to its successor layer by connections between the nodes of the layers that transfer data from a node of a layer to a node of the successor layer.

Each node or neuron of a layer typically has multiple inputs, and a weight is assigned to each input of each node in a learning or training stage. During this learning or training stage, known training data is supplied to a layer of the neural network and individual neurons of the layer assign weights to their inputs based on the task being performed. By comparing the resultant outputs with the known training data, and repeating over a series of iterations, the neural network learns the optimum weights to assign to the inputs of the neurons for the task being performed.

During subsequent use of the neural network, operational input data is supplied to the input layer of the neural network. Data applied to a neuron of the input layer is weighted according to the weights assigned to the inputs of the neuron—i.e. the neuron applies the weight assigned to each of its inputs to the data received at the respective inputs. The neuron sums the weighted input data and performs a non-linear activation function on the sum of the weighted input data to generate an output data value, which is transmitted to one or more neurons of the next layer of the neural network, which may be an output layer or an intermediate layer. The use of a trained neural network to apply weights to operational input data is known as inference.

Traditionally the training and inference stages have been performed by centralised servers or "in the cloud", receiving inputs from and providing resultant outputs to so-called "edge" devices, e.g. mobile phones, table computers, "smart" devices etc. However, increasingly there is a drive to provide neural nets for inference locally in such devices, which may receive trained weights from training processes performed remotely.

In addition, inference systems are increasingly intended for use in always-on applications, e.g. always-on audio monitoring or image processing systems.

Additionally, there is increasing interest in on-device learning, in which an edge device receives a current neural net model from a provider and performs additional training of the received model itself, using data stored locally on the edge device.

Typically the learned weights for a neural network are stored in a memory array. As will be appreciated, however, for even a simple neural network with a relatively small number of neurons, the amount of memory required to store the weights is significant.

The trend towards providing local neural nets and inference systems within edge devices is driving requirements for reduced power consumption and memory requirements and increased flexibility in such neural networks and inference systems.

SUMMARY

According to a first aspect, the invention provides a neuron for an artificial neural network comprising:
  a first dot product engine operative to:
    receive a first set of weights;
    receive a set of inputs; and
    calculate the dot product of the set of inputs and the first set of weights to generate a first dot product engine output;
  a second dot product engine operative to:
    receive a second set of weights;
    receive an input based on the first dot product engine output; and
    generate a second dot product engine output based on the product of the first dot product engine output and a weight of the second set of weights; and
  an activation function module arranged to generate a neuron output based on the second dot product engine output,
  wherein the first dot product engine and the second dot product engine are structurally or functionally different.

The weights of the second set of weights may have different quantisation than the weights of the first set of weights.

The weights of the first set of weights may each have a different number of bits than the weights of the second set of weights.

For example, the weights of the first set of weights may each have a greater number of bits than the weights of the second set of weights.

A resolution or bit-width of the first dot product engine may be different from a resolution or bit-width of the second dot product engine.

For example, a resolution or bit-width of the first dot product engine may be greater than a resolution or bit-width of the second dot product engine.

One of the first and second dot product engines may be a digital dot product engine and the other of the first and second dot product engines may be an analog dot product engine.

Alternatively, the first and second dot product engines may be analog dot product engines.

The neuron may further comprise buffer circuitry operative to receive the first dot product engine output and to output a buffered signal to the second dot product engine.

The first and second dot product engines may be operative to convert input voltage signals into output current signals, and the buffer circuitry may comprise a current to voltage converter.

Alternatively, the first and second dot product engines may be operative to convert input current signals into voltage signals, and the buffer circuitry may comprise a voltage to current converter.

The neuron may further comprise one or more memories for storing the first and second sets of weights.

The first dot product engine or the second dot product engine may comprise an array of non-volatile memory elements, for example flash memory, MRAM, RRAM, nanotubes, or any memristive element such as a memristor.

According to a second aspect, the invention provides an artificial neural network system comprising a plurality of neurons according to the first aspect.

According to a third aspect, the invention provides an artificial neural network system for an artificial neural network comprising:
- a first compute unit operative to:
  - receive a first set of weights derived from a matrix of weights for the artificial neural network;
  - receive a set of inputs; and
  - calculate a plurality of dot products of the set of inputs and subsets of the first set of weights to generate a set of first dot product outputs;
- a second compute unit operative to:
  - receive a second set of weights derived from the matrix of weights for the artificial neural network;
  - receive the set of first dot product outputs;
  - calculate a plurality of dot products of the set of first dot product outputs and subsets of the second set of weights to generate a set of second dot product outputs;
  and
- a plurality of activation function units configured to apply a set of activation functions to the set of second dot product outputs to generate a set of ANN system outputs,
- wherein the first compute unit is structurally or functionally different from the second compute unit.

According to a fourth aspect, the invention provides an artificial neural network system for an artificial neural network comprising:
- a first compute unit operative to:
  - receive a first set of weights, each weight of the first set of weights having a first quantisation level;
  - receive a set of inputs; and
  - calculate a plurality of dot products of the set of inputs and subsets of the first set of weights to generate a set of first dot product outputs;
- a second compute unit operative to:
  - receive a second set of weights, each weight of the first set of weights having a second quantisation level that is different than the first quantisation level;
  - receive the set of first dot product outputs; and
  - calculate a plurality of dot products of the set of first dot product outputs and the second set of weights to generate a set of second dot product outputs; and
- a plurality of activation function units configured to apply a set of activation functions to the set of second dot product outputs to generate a set of ANN system outputs.

According to a fifth aspect, the invention provides an artificial neural network system for an artificial neural network comprising:
- a digital compute unit operative to:
  - receive a first set of weights;
  - receive a set of inputs; and
  - calculate a plurality of dot products of the set of inputs and subsets of the first set of weights to generate a set of analog compute unit outputs;
- an analog compute unit operative to:
  - receive a second set of weights;
  - receive the set of digital compute unit outputs; and
  - calculate a plurality of dot products of the set of digital compute unit outputs and the second set of weights to generate a set of analog compute unit outputs;
  and
- a plurality of activation function units configured to apply a set of activation functions to the set of analog dot product outputs to generate a set of ANN system outputs.

According to a sixth aspect, the invention provides an integrated circuit comprising a neuron or a plurality of neurons according to the first aspect.

According to a seventh aspect, the invention provides a device comprising an integrated circuit according to the sixth aspect.

The device may be a mobile telephone, a tablet or laptop computer or an Internet of Things (IoT) device, for example.

BRIEF DESCRIPTION OF THE DRAWINGS

Embodiments of the invention will now be described, strictly by way of example only, with reference to the accompanying drawings, of which.

DETAILED DESCRIPTION

Figure 1:
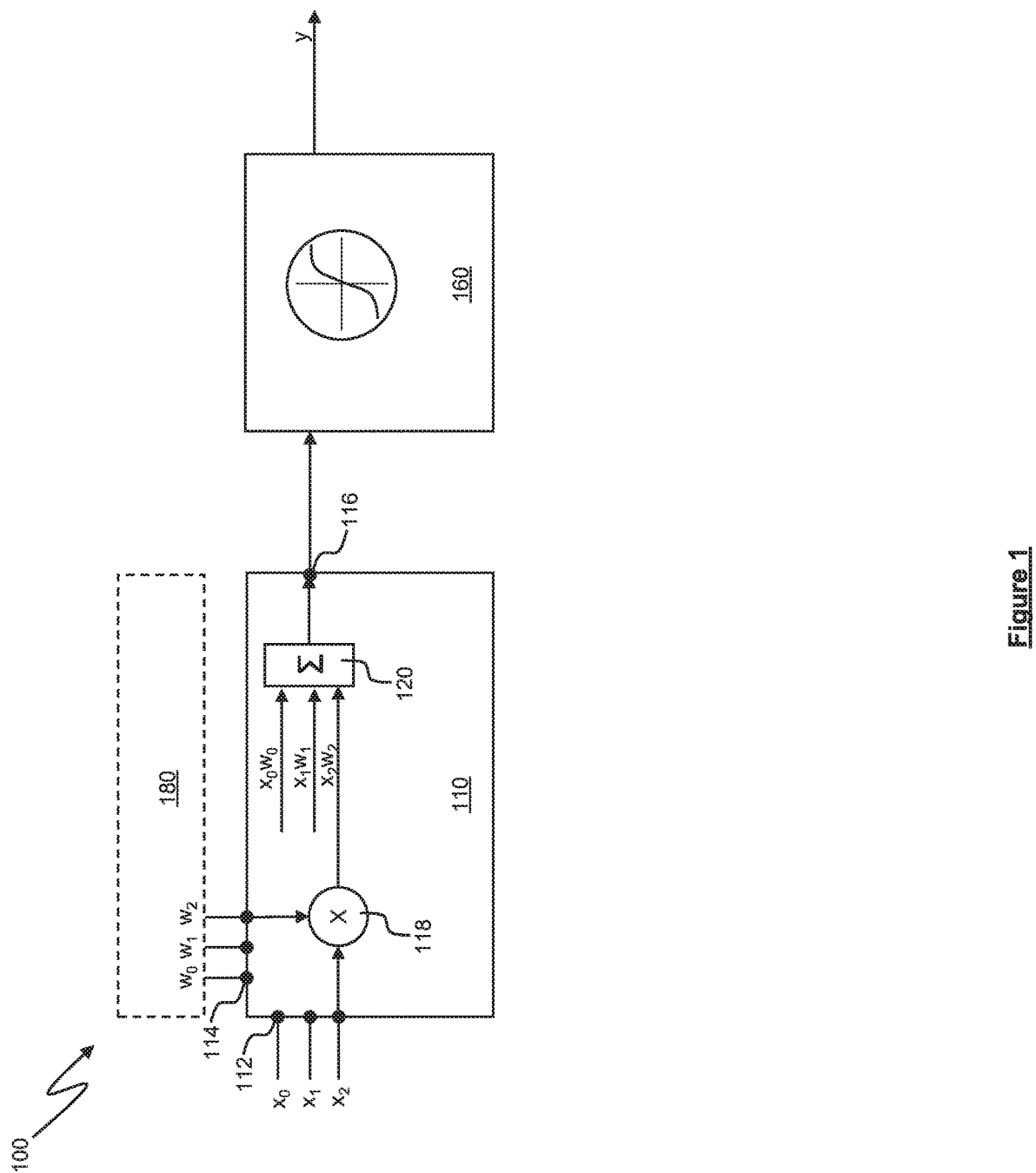
FIG. 1 is simplified schematic representation of a neuron for an artificial neural network.

Referring first to FIG. 1, a neuron for an artificial neural network (ANN) is shown generally at 100, and comprises a dot product engine 110 and an activation function unit 160.

A neuron of a neural network can be modelled, in part, by a vector multiplication operation, multiplying a vector of input values (representing the inputs to the neuron) by a vector of weights or coefficients (representing the weights applied by the neuron to its inputs) to generate an intermediate output value (representing the sum of the results of the multiplication of each input value with the corresponding weight value, i.e. the dot product of the input vector and the weight vector). This intermediate output value is then subjected to an activation function to provide the neuron output.

The dot product engine 110 of FIG. 1 is configured to calculate the dot product of a plurality (in this example three) of input signals and a plurality (in this example three) of weight signals, by multiplying each input with a corresponding weight and summing the results of the multiplication to generate a single output value. Thus the dot product engine implements part of the functionality of a neuron of a neural network.

To this end, the dot product engine 110 has a plurality of parallel data input terminals 112 for receiving input data signals, a plurality of weight input terminals 114 for receiving weight data signals, and a data output terminal 116 for outputting a result of a calculation of the dot product of the input data signals and the weight data signals.

The dot product engine 110 further includes a plurality of computation elements 118 (of which, for the sake of clarity, only one is shown in FIG. 1) and a summation unit 120.

The computation elements 118 may be digital computation elements or analog computation elements. In the case where the computation elements 118 are digital computation elements, the dot product engine 110 may be referred to as a digital dot product engine, whereas if the computation elements 118 are analog computation elements the dot product engine 110 may be referred to as an analog dot product engine.

In one example, the computation elements 118 may be based on memristors, in which case the weight data signals received by the dot product engine 110 via the weight input terminals 114 may be, for example, signals (e.g. currents) that are used to program the computation elements 118 with weight data. Alternatively, the computation elements may be non-volatile memory elements, for example flash memory, MRAM, RRAM, nanotubes, or the like.

Where the computation elements 118 are digital computation elements, the weight data signals may be received from a memory 180, external to the dot product engine 110, which stores weight values.

In use of the system 100, input data signals $x_0$, $x_1$, $x_2$ are received at the data input terminals 112 of the dot product engine 110. A computation element 118 of the dot product engine 110 multiplies each received input signal $x_0$, $x_1$, $x_2$ with a corresponding weight $w_0$, $w_1$, $w_2$ and outputs an output signal representing the result of the multiplication to the summation unit 120. For example, as shown in FIG. 1, a computation element 118 of the dot product engine 110 calculates the product of input signal $x_2$ and weight $w_2$ and outputs a signal representing the result $x_2w_2$ of this multiplication to the summation unit 120.

The summation unit 120 sums the results $x_0w_0$, $x_1w_1$, $x_2w_2$ of the multiplication operations performed by the computation elements 118 and outputs a dot product output signal representing the sum of the multiplication operations to the non-linear activation function 160, via the output terminal 116 of the dot product engine 110.

The non-linear activation function 160 performs a non-linear activation function on the dot product output signal. For example, the non-linear activation function unit 160 may compare the magnitude of the dot product output signal to a threshold, and output an output signal y having a magnitude equal to that of the dot product output signal if the magnitude of the dot product output signal meets or exceeds the threshold. If the magnitude of the dot product output signal is below the threshold, the non-linear activation function unit 160 may output a zero or a signal having some other constant magnitude. It will be understood that this is a simple example of a non-linear activation function, and that alternative non-linear functions may be used as required by the particular circumstances and application of the net in which the neuron 100 is used. For example, the non-linear activation function may include or be based on a non-linear function such as a cube, square, ReLU, sigmoid, tan h. Other suitable non-linear functions will be familiar to those skilled in the art.

As discussed above, the dot product engine 110 of FIG. 1 is configured to implement the multiplication of an input vector X by a weight vector W to generate an output value Y, i.e. the dot product engine 110 implements the vector calculation Y=W·X.

Figure 2:
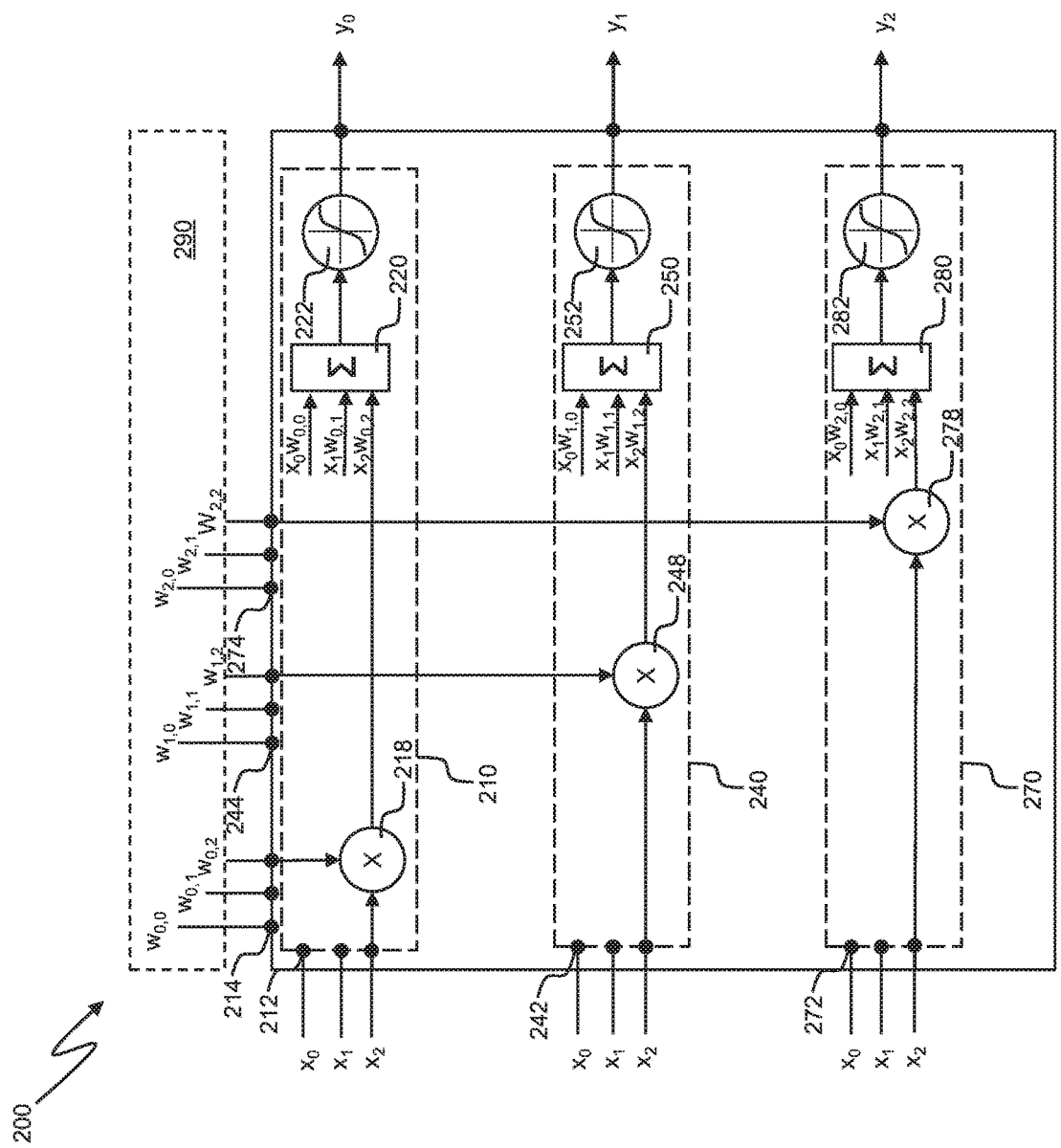
FIG. 2 is a simplified schematic representation of an artificial neural network (ANN) system including a plurality of neurons.

A typical artificial neural network system will include a plurality of neurons 100. FIG. 2 is a schematic representation of an ANN system including a plurality of neurons 100. The example ANN system 200 illustrated in FIG. 2 includes a first neuron 210, a second neuron 240 and a third neuron 270, each of which includes a dot product engine and an activation function unit.

Thus, each neuron 210, 240, 270 includes a respective plurality of computation elements 218, 248, 278 (of which, for the sake of clarity, only one is shown for each neuron in FIG. 2) and a respective summation unit 220, 250, 270. The computation elements 228, 248, 278 may be digital computation elements or analog computation elements as described above.

Each neuron 210, 240, 270 also includes a summation unit 220, 250, 280 and an activation function unit 222, 252, 282. The computation elements 218 and summation unit 220 of the first neuron 210 together form a dot product engine of the first neuron 210. Similarly, the computation elements 248 and summation unit 250 of the second neuron 240 together form a dot product engine of the second neuron 240, and the computation elements 278 and summation unit 280 of the third neuron 270 together form a dot product engine of the third neuron 270.

In use of the ANN system 200, input data signals $x_0$, $x_1$, $x_2$ are received at respective data input terminals 212, 242, 272 of each neuron 210, 240, 270. Weight data signals $w_{0,0}$, $w_{0,1}$, $w_{0,2}$ are received at weight data terminals 214 of the first neuron 210, weight data signals $w_{1,0}$, $w_{1,1}$, $w_{1,2}$ are received at weight data terminals 244 of the second neuron 240, and weight data signals $w_{2,0}$, $w_{2,1}$, $w_{2,2}$ are received at weight data terminals 274 of the third neuron 270. Thus, each neuron 210, 240, 270 receives the same input data signals, but receives different weight data signals. The weight data signals may be received from a memory 290, external to the neurons 210, 240, 270, which stores weight values.

The computation elements 218 of the first neuron 210 multiply each received input signal $x_0$, $x_1$, $x_2$ with a corresponding weight $w_{0,0}$, $w_{0,1}$, $w_{0,2}$ and provides an output signal representing the result of the multiplication to the summation unit 220 of the first neuron 210. The summation unit 220 sums the results $x_0w_{0,0}$, $x_1w_{0,1}$, $x_2w_{0,2}$ of the multiplication operations performed by the computation elements 228 and outputs a dot product output signal representing the sum of the multiplication operations to the activation function unit 222, which applies an activation function to the received dot product output signal as described above. Thus, the dot product engine of the first neuron 210 calculates the product of each input signal $x_0$, $x_1$, $x_2$ and the corresponding weight $w_{0,0}$, $w_{0,1}$, $w_{0,2}$ and sums the calculated products to generate a dot product output.

Similarly, the computation elements 248 of the second neuron 240 multiply each received input signal $x_0$, $x_1$, $x_2$ with a corresponding weight $w_{1,0}w_{1,1}$, $w_{1,2}$ and output an output signal representing the result of the multiplication to the summation unit 250 of the second neuron 240. The summation unit 240 sums the results $x_0w_{0,0}$, $x_1w_{1,1}$, $x_2w_{1,2}$ of the multiplication operations performed by the computation elements 248 and outputs a dot product output signal representing the sum of the multiplication operations to the activation function unit 252, which applies an activation function to the received dot product output signal as described above. Thus, the dot product engine of the second neuron 240 calculates the product of each input signal $x_0$, $x_1$, $x_2$ and the corresponding weight $w_{1,0}$, $w_{1,1}$, $w_{1,2}$ and sums the calculated products to generate a dot product output.

Similarly, the computation elements 278 of the third neuron 270 multiply each received input signal $x_0$, $x_1$, $x_2$ with a corresponding weight $w_{2,0}$, $w_{2,1}$, $w_{2,2}$ and output an output signal representing the result of the multiplication to the summation unit 280 of the third neuron 270. The summation unit 280 sums the results $x_0 w_{2,0}$, $x_1 w_{2,1}$, $x_2 w_{2,2}$ of the multiplication operations performed by the computation elements 278 and outputs a dot product output signal representing the sum of the multiplication operations to the activation function unit 282, which applies an activation function to the received dot product output signal as described above. Thus, the dot product engine of the third neuron 270 calculates the product of each input signal $x_0$, $x_1$, $x_2$ and the corresponding weight $w_{2,0}$, $w_{2,1}$, $w_{2,2}$ and sums the calculated products to generate a dot product output.

Thus, each neuron 210, 240, 270 of the ANN system 200 implements the multiplication of a common input vector X by a different row of a weight matrix W to generate an output vector Y, i.e. the ANN system 200 implements the vector-matrix calculation Y=WX If the weight matrix W is a matrix of dimensions m rows x n columns, then in order to store all of the weight data a memory such as memory 180 will need to have a total of (n×m) memory cells.

If the input vector X is of dimensions n rows, a total of m×n multiplication operations will need to be performed in order to calculate the output vector Y.

For example, for the ANN system of FIG. 2, the matrix $$W = \begin{bmatrix} w_{0,0} & w_{0,1} & w_{0,2} \\ w_{1,0} & w_{1,1} & w_{1,2} \\ w_{2,0} & w_{2,1} & w_{2,2} \end{bmatrix}$$

and the vector $$X = \begin{bmatrix} x_0 \\ x_1 \\ x_2 \end{bmatrix}.$$

The output matrix Y can thus be calculated as follows:

$$Y = \begin{bmatrix} w_{0,0} & w_{0,1} & w_{0,2} \\ w_{1,0} & w_{1,1} & w_{1,2} \\ w_{2,0} & w_{2,1} & w_{2,2} \end{bmatrix} \times \begin{bmatrix} x_0 \\ x_1 \\ x_2 \end{bmatrix} = \begin{bmatrix} w_{0,0}x_0 + w_{0,1}x_1 + w_{0,2}x_2 \\ w_{1,0}x_0 + w_{1,1}x_1 + w_{1,2}x_2 \\ w_{2,0}x_0 + w_{2,1}x_1 + w_{2,2}x_2 \end{bmatrix}$$

Thus, in calculating the vector-matrix multiplication Y=WX, a total of 9 (=3 rows of matrix W×3 elements of vector X) multiplication operations must be performed.

As will be appreciated by those skilled in the art, memory can be a scarce resource, particularly in edge devices such as mobile telephones as the like, where restrictions on the physical size of the device impose limitations on the size of components such as memory chips, and therefore the amount of memory that can be provided in such devices.

Further, it is desirable generally, and in battery powered devices in particular, to minimise or at least reduce the power consumption of a device. One way that this can be achieved is to reduce the number of processing operations that must be performed by processing elements of the device.

Figure 3:
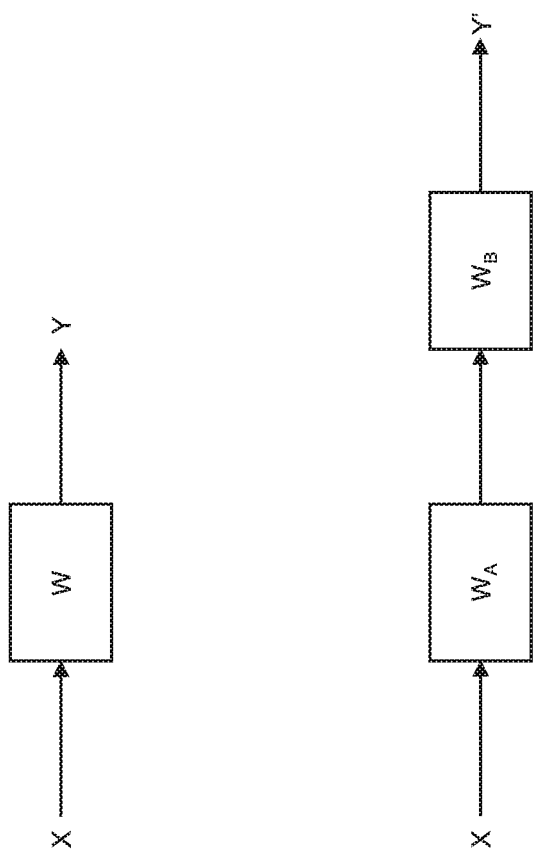
FIG. 3 is a schematic representation of an approximation of a matrix multiplication operation.

As illustrated schematically at 200 in FIG. 3, the vector-matrix calculation Y=WX can be approximated as Y≈$W_B$ $W_A$X, where $W_A$ and $W_B$ are matrices derived from the matrix W. The matrices $W_A$ and $W_B$ may be derived from the matrix W using a number of matrix decomposition techniques, for example the singular value decomposition (SVD).

The SVD is a method of decomposing an m×n matrix W into three matrices U, S, and $V^T$, where U is an m×n matrix, S is an n×n diagonal matrix and V is an n×n matrix.

After decomposition of the matrix W into the three matrices U, S, and $V^T$, the rank of the diagonal matrix S can be reduced to effect a lossy compression of the matrix W. In general the size of the matrix S can be reduced from n to r, and this reduction in the size of S corresponds to a removal of low value Eigenvalues of the matrix W. Thus, reducing the rank of S allows a reduction in the total number of matrix coefficients that need to be stored in order to generate an approximation of the matrix W.

The degree of reduction of the matrix S may be chosen to effect a reduction that meets predetermined computational performance requirements, or may be chosen to facilitate the mapping of a matrix of weights onto a fixed hardware implementation.

Once the matrix S has been reduced, it can be multiplied into either U or $V^T$, to leave two matrices which can be multiplied together to generate an approximation of the original matrix W. As the total number of matrix coefficients in the resulting two matrices is reduced, the total number of computations required in order to generate an acceptable approximation of the result of the multiplication of the matrix W by an input vector X (i.e. Y'=U$V^T$X≈WX) is reduced, as compared to the total number of computations required in order to generate the result the multiplication of the matrix W by the input vector X (i.e. Y=XW).

In general, in order for there to be a reduction in both the memory required for storage of the matrices derived from a matrix W and the number of computations required to generate the approximation Y', r should be less than mn/(m+n).

A matrix decomposition technique such as the SVD can thus be applied to a matrix W of weights that has been generated for use in a neural network in order to generate two matrices $W_A$ and $W_B$. Each of the matrices $W_A$ and $W_B$ is smaller than the matrix W, and the total size of $W_A$ and $W_B$ is preferably less than that of the matrix W. Thus, the two matrices $W_A$ and $W_B$ together constitute a compressed representation of the matrix W, and require less memory for storage of weights than the single matrix W. Further, as the matrices $W_A$ and $W_B$' each contain fewer elements than the matrix W, the number of processing operations that must be performed in order to generate the approximation Y'=$W_A W_B$X≈Y may be less than the number of processing operations that would be required in order to perform the calculation Y=WX.

The multiplication of the matrix S into one of the other matrices U or $V^T$ also has the effect of changing the quantization sensitivity of the two matrices. The matrix into which S is not embedded into may show a lower sensitivity to quantisation than the matrix into which S is embedded. As a result, matrix multiplication using this particular matrix (i.e. the matrix into which the matrix S has not been multiplied) may advantageously be effected using a lower accuracy circuit than matrix multiplication using the other matrix (i.e. the matrix into which the matrix S has been multiplied). This may allow further savings in power and circuit complexity and the total number of coefficient bits to be stored in memory. A reduced resolution requirement may also render feasible circuit architectures that are infeasible for higher resolution, with advantages in power or complexity or size The vector-matrix calculation $Y'=W_B W_A X$ is a multiplication of the input vector X by a compressed representation of the matrix W. It will be appreciated that the result of the vector-matrix calculation $Y'=W_B W_A X$ only approximates the result Y of the vector-matrix calculation WX, as some information is lost in the decomposition of the single matrix W into the two matrices $W_A$ and $W_B$. However, neural networks are typically over-specified, and so reducing the number of weights used in a neural network in the manner described above has little impact on the operation and performance of the neural network.

The present disclosure exploits this over-specification of neural networks to reduce the memory and computation requirements of a system for implementing a neural network (or a layer or node of a neural network).

Figure 4:
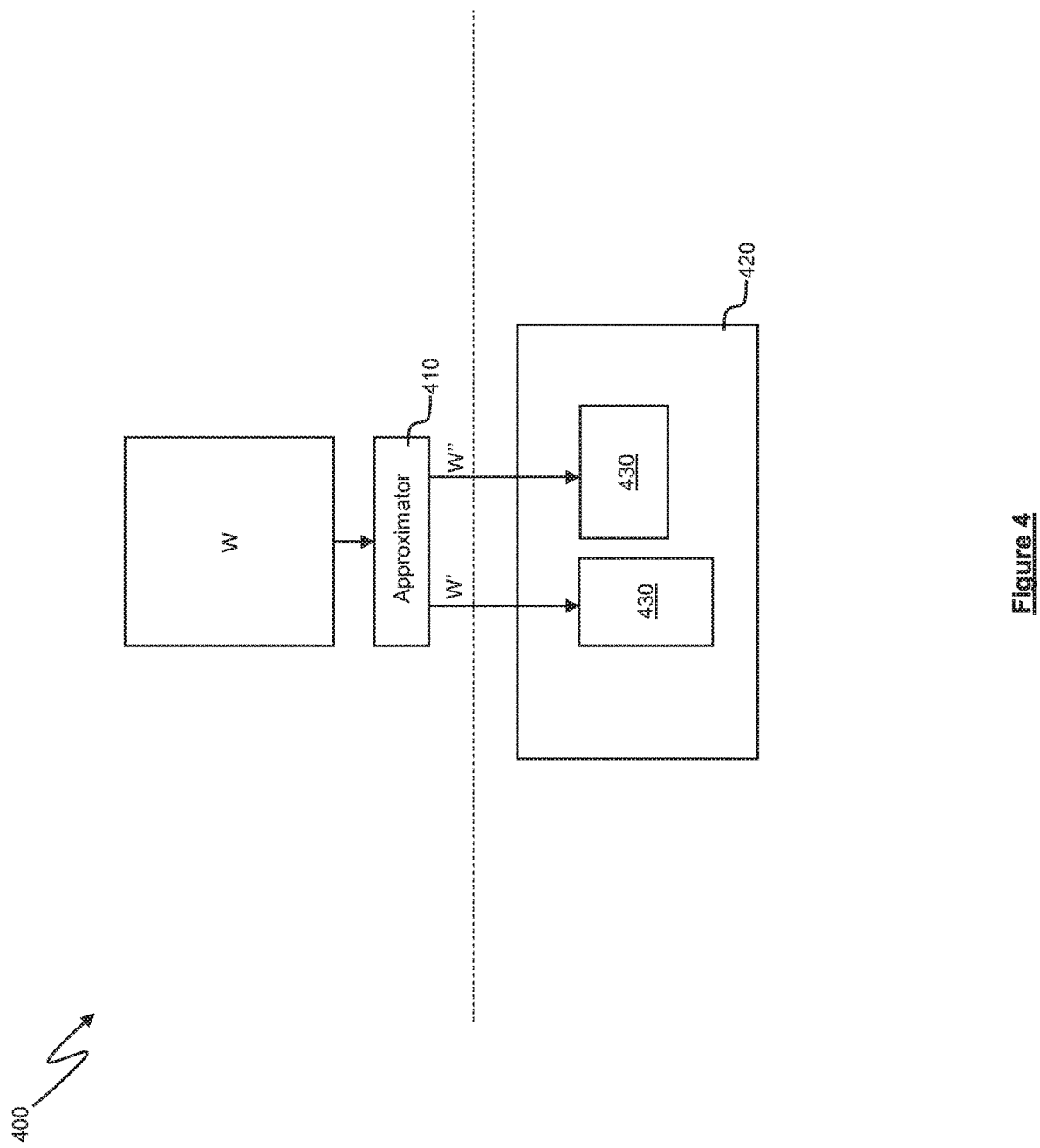
FIG. 4 schematically illustrates a mechanism for configuring an artificial neural network system with two sets of weights derived from a single matrix of weights.

Thus, as illustrated generally at 400 in FIG. 4, a matrix W containing a plurality of coefficients representing weights that have been generated for use in a neural network system can be input to an approximation system 410 to generate two matrices $W_A$ and $W_B$, which are then transmitted to a device 420 such as a mobile telephone, laptop or desktop computer, IoT device or other edge device and stored, e.g. in one or more memory units 430 for subsequent use by the device in inference operations performed on input data by the device 420. The approximation system 410 will be typically be separate from the device 420, for example being implemented on a computer or server or in the cloud.

The decomposition of the matrix W into the two matrices $W_A$ and $W_B$ permits the design of an alternative processing system for implementing an artificial neural network or a layer of an artificial neural network, as will now be discussed with reference to FIG. 5.

Figure 5:
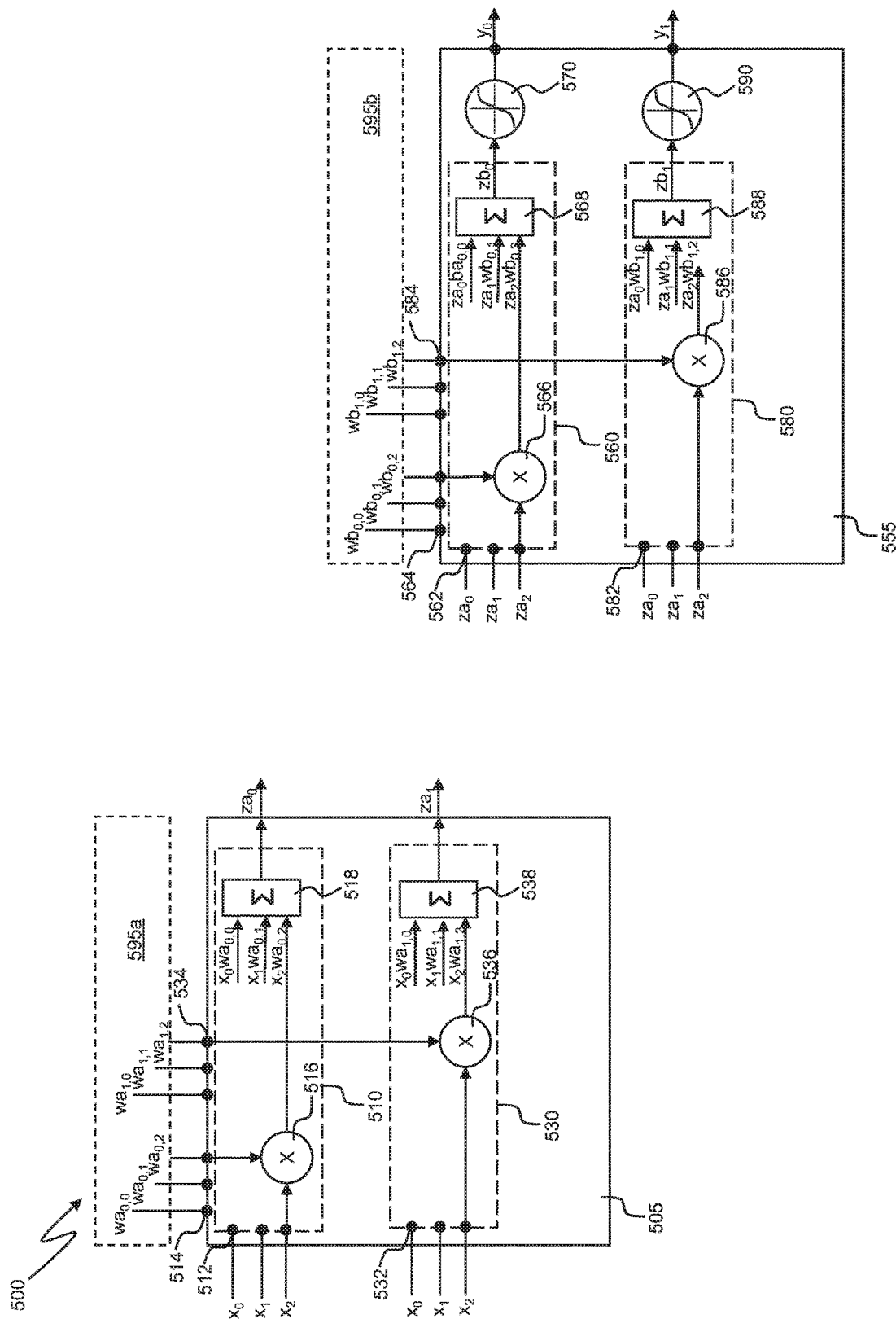
FIG. 5 is a schematic representation of an alternative ANN system.

An example of an alternative neural network system is shown generally at 500 in FIG. 5. The alternative ANN system 500 requires less memory for storing weights than the ANN system 200 of FIG. 2, as will become apparent from the following description.

The ANN system 500 is configured to implement the multiplication of an input vector X by first and second weight matrices $W_A$ and $W_B$ i.e. the ANN system 500 implements the vector-matrix calculation $Y'=W_A W_B X$, which, as explained above, is a multiplication of the input vector X by a compressed representation of the weight matrix W.

To this end, the ANN system 500 includes a first compute unit 505 and a second compute unit 555.

The first compute unit 505 includes a plurality of dot product engines. For the sake of clarity only two dot product engines (a first dot product engine 510 and a second dot product engine 530) are shown in the first compute unit 505 in FIG. 5, but it is to be understood that a practical implementation of the ANN system 500 may include more than two dot product engines in the first compute unit 505.

Each dot product engine 510, 530 of the first compute unit 505 is configured to calculate the dot product of a common set of input signals and a different subset of weight signals that are based on a set of weights belonging to a first weight matrix $W_A$. Thus, the first dot product engine 510 is configured to calculate the dot product of a set of inputs $x_0$, $x_1$, $x_2$ and a first subset of weights $wa_{0,0}$, $wa_{0,1}$, $wa_{0,2}$, whilst the second dot product engine 530 is configured to calculate the dot product of the same set of inputs $x_0$, $x_1$, $x_2$ and a second subset of weights $wa_{1,0}$, $wa_{1,1}$, $wa_{1,2}$. The weight matrix $W_A$ may be stored in a memory 595a that is external to the dot product engines 510, 530, for example.

The first dot product engine 510 includes a plurality of computation elements 516 (of which, for the sake of clarity, only one is shown in FIG. 5) and a summation unit 518. The computation elements 516 may be digital computation elements or analog computation elements, as described above. In use of the ANN system 500, the input data signals $x_0$, $x_1$, $x_2$ are received at data input terminals 512 of the first dot product engine 510. A computation element 516 of the first dot product engine 510 multiplies each received input signal $x_0$, $x_1$, $x_2$ with a corresponding weight $wa_{0,0}$, $wa_{0,1}$, $wa_{0,2}$ of the first subset of weights and outputs an output signal representing the result of the multiplication to the summation unit 518. For example, as shown in FIG. 5, a computation element 516 of the first dot product engine 510 calculates the product of input signal $x_2$ and weight $wa_{0,2}$ and outputs a signal representing the result $x_2 wa_{0,2}$ of this multiplication to the summation unit 518.

The summation unit 518 sums the results $x_0 wa_{0,0}$, $x_1 wa_{0,0}$, $x_2 wa_{0,2}$ of the multiplication operations performed by the computation elements 516 and outputs a dot product output signal $za_0$.

Similarly, the second dot product engine 530 includes a plurality of computation elements 536 (of which, for the sake of clarity, only one is shown in FIG. 5) and a summation unit 538. The computation elements 536 may be digital computation elements or analog computation elements, as described above. In use of the ANN system 500, the input data signals $x_0$, $x_1$, $x_2$ are received at data input terminals 532 of the second dot product engine 530. A computation element 536 of the second dot product engine 530 multiplies each received input signal $x_0$, $x_1$, $x_2$ with a corresponding weight $wa_{1,0}$, $wa_{1,1}$, $wa_{1,2}$ of the second subset of weights and outputs an output signal representing the result of the multiplication to the summation unit 538. For example, as shown in FIG. 5, a computation element 536 of the second dot product engine 530 calculates the product of input signal $x_2$ and weight $wa_{1,2}$ and outputs a signal representing the result $x_2 wa_{1,2}$ of this multiplication to the summation unit 538.

The summation unit 538 sums the results $x_0 wa_{1,0}$, $x_1 wa_{1,1}$, $x_2 wa_{1,2}$ of the multiplication operations performed by the computation elements 536 and outputs a dot product output signal $za_1$.

Thus, each dot product engine 510, 530 of the first compute unit 505 of the ANN system 500 implements the multiplication of a common input vector X by a different row of the first weight matrix $W_A$, and generates an output vector $Z_A$ containing the dot products $za_0$, $za_1$ calculated by the summation units 518, 538.

The second compute unit 555 also includes a plurality of dot product engines. Again, for the sake of clarity only two dot product engines (a first dot product engine 560 and a second dot product engine 580) are shown in the second compute unit 555 in FIG. 5, but it is to be understood that a practical implementation of the ANN system 500 may include more than two dot product engines in the second compute unit 555.

Each dot product engine 560, 580 of the second compute unit 555 is configured to calculate the dot product of the set of outputs of the first compute unit 505 a different subset of weight signals that are based on a set of weights belonging to a second weight matrix $W_B$. Thus, the first dot product engine 560 is configured to calculate the dot product of a set of inputs $za_0$, $za_1$, $za_2$ received from the first compute unit 505 and a first subset of weights $wb_{0,0}$, $wb_{0,1}$, $wb_{0,2}$, whilst the second dot product engine 560 is configured to calculate the dot product of the same set of inputs $za_0$, $za_1$, $za_2$ and a second subset of weights $wb_{1,0}$, $wb_{1,1}$, $wb_{1,2}$. The second weight matrix $W_B$ may be stored in a memory 595b that is external to the dot product engines 560, 580, for example.

The first dot product engine 560 includes a plurality of computation elements 566 (of which, for the sake of clarity, only one is shown in FIG. 5) and a summation unit 568. The computation elements 566 may be digital computation elements or analog computation elements, as described above. In use of the ANN system 500, the input data signals $za_0$, $za_1$, $za_2$ are received at data input terminals 562 of the first dot product engine 560. A computation element 566 of the first dot product engine 560 multiplies each received input signal $za_0$, $za_1$, $za_2$ with a corresponding weight $wb_{0,0}$, $wb_{0,1}$, $wb_{0,2}$ of the first subset of weights and outputs an output signal representing the result of the multiplication to the summation unit 568. For example, as shown in FIG. 5, a computation element 566 of the second dot product engine 550 calculates the product of input signal $za_2$ and weight $wb_{0,2}$ and outputs a signal representing the result $za_2 wb_{0,2}$ of this multiplication to the summation unit 568.

The summation unit 568 sums the results $za_0 wa_{0,0}$, $za_1 wa_{0,1}$, $za_2 wa_{0,2}$ of the multiplication operations performed by the computation elements 566 and outputs a dot product output signal $zb_0$.

Similarly, the second dot product engine 580 includes a plurality of computation elements 586 (of which, for the sake of clarity, only one is shown in FIG. 5) and a summation unit 588. The computation elements 586 may be digital computation elements or analog computation elements, as described above. In use of the ANN system 500, the input data signals $za_0$, $za_1$, $za_2$ are received at data input terminals 582 of the second dot product engine 580. A computation element 586 of the second dot product engine 580 multiplies each received input signal $za_0$, $za_1$, $za_2$ with a corresponding weight $wb_{1,0}$, $wb_{1,1}$, $wb_{1,2}$ of the second subset of weights and outputs an output signal representing the result of the multiplication to the summation unit 538. For example, as shown in FIG. 5, a computation element 586 of the second dot product engine 580 calculates the product of input signal $za_2$ and weight $wb_{1,2}$ and outputs a signal representing the result $za_2 wb_{1,2}$ of this multiplication to the summation unit 588.

The summation unit 588 sums the results $za_0 wa_{1,0}$, $za_1 wa_{1,1}$, $za_2 wa_{1,2}$ of the multiplication operations performed by the computation elements 586 and outputs a dot product output signal $za_2$.

Thus, each dot product engine 560, 580 of the second compute unit 555 of the ANN system 500 implements the multiplication of the vector $Z_A$ output by the first compute unit 505 by a different row of a second weight matrix $W_B$, and generates an output vector $Z_B$ containing the dot products $zb_0$, $zb_1$ by the summation units 568, 588.

Accordingly, the combination of the first compute unit 505 and the dot product engines of the second compute unit 555 can be said to perform the vector-matrix multiplication $Z_B = W_B W_A X$, where $Z_B$ is a vector of the dot products output by the summation units of the second compute unit 505, $W_A$ is a first matrix of weights and $W_B$ is a second matrix of weights.

The second compute unit 555 further includes a plurality of activation function units, of which, for clarity, only two (a first activation unit 570 and a second activation unit 590) are shown in FIG. 5. Each activation function unit receives a dot product output signal from a respective one of the summation units 568, 588 of the second compute unit 555 and performs a non-linear activation function on the received signal in the manner described above to generate a respective output signal. Thus, in the example ANN system of FIG. 5, a first activation function unit 570 receives the dot product output $zb_0$ from the first summation unit 568 and performs a non-linear activation function on it to generate a first output signal $y_0$, whilst a second activation function unit 590 receives the dot product output $zb_1$ from the second summation unit 588 and performs a non-linear activation function on it to generate a second output signal $y_1$.

Thus, the second compute unit 555 can be said to output an output vector Y containing the output signals of the activation function units 570, 590 of the second compute unit 555.

As will be appreciated, because the weights of the first weight matrix $W_A$ and the weights of the second weight matrix $W_B$ result from the decomposition of the weight matrix W, the amount of memory required to store the weights of the first and second weight matrices first $W_A$, $W_B$ is less than the amount of memory that would be required to store weights based on the weights of the weight matrix W. Further, as a result of the reduced number of weights, the total number of computations required for the ANN system 500 to perform the vector-matrix calculation $Z_B = W_B W_A X$ to generate an approximation of the result Y of the matrix calculation Y=WX is less than the total number of computations required for the ANN system 200 of FIG. 2 to perform the matrix calculation Y=WX.

Thus, the ANN system 500 requires less memory and fewer computations than the ANN system 200 in implementing an artificial neural network or part (e.g. a layer) of an ANN. This reduction in memory and computation requirements comes at the cost of reduced computational accuracy in the ANN. However, as discussed above, neural networks are typically over-specified and so a small reduction in computational accuracy will usually not result in any significant adverse effect on the performance of the neural network.

The first compute unit 505 and the second compute unit 555 are separate and distinct from each other, in the sense that the second compute unit 555 is structurally or functionally different from the first compute unit. For example, the first compute unit 505 may be a digital compute unit, in the sense that the computation elements 526, 536 of its dot product engines 510, 530 are digital computation elements, whilst the second compute unit 555 may be an analog compute unit, in the sense that the computation elements 566, 586 of its dot product engines 560, 580 are analog computation elements, in which case the first compute unit 505 and the second compute unit 555 are structurally different.

Additionally or alternatively, the first and second compute units 505, 555 may use different quantisation levels, in which case the first and second compute units 505, 555 are functionally different.

For example, if the first and second compute units 505, 555 are digital compute units, in the sense that the computation elements 516, 536, 566, 586 of their dot product engines 510, 530, 560, 580 are digital computation elements, the resolution or bit-width of the computation elements 516, 536 of the dot product engines 510, 530 of the first compute unit 505 may be different from the resolution or bit-width of the computation elements 566, 586 of the dot product engines 560, 580 of the second compute unit 555.

In one embodiment the resolution or bit-width of the computation elements 516, 536 of the dot product engines 510, 530 of the first compute unit 505 is greater than the resolution or bit-width of the computation elements 566, 586 of the dot product engines 560, 580 of the second compute unit 555. Thus, in this embodiment the accuracy of the calculations performed by the first compute unit 505 is greater than the accuracy of the calculations performed by the second compute unit 555. The above-described arrangement could be reversed, however, with a lower accuracy compute unit being used as the first compute unit 505 and a higher accuracy compute unit being used as the second compute unit 555. For such an implementation it is likely that it would be $W_B$ which has absorbed the diagonal matrix S rather than $W_A$.

If the first and second compute units 505, 555 are analog compute units, in the sense that the computation elements 516, 536, 566, 586 of their dot product engines 510, 530, 560, 580 are analog computation elements, the accuracy or resolution of the weights applied by the first compute unit 505 may be different from the accuracy or resolution of the weights applied by the second compute unit 555.

For example, the computation elements 516, 536 of the dot product engines 510, 530 of the first compute unit 505 may be configured to apply a weight having a greater number of bits than the computation elements 566, 586 of the dot product engines 560, 580 of the second compute unit 555. The computation elements 516, 536 of the dot product engines 510, 530 of the first compute unit 505 may thus include multiple memristors, each programmable in one of two states but used in combinations, such that a multi-bit weighting can be applied to inputs by the computation elements 516, 536 of the dot product engines of 510, 530 of the first compute unit 505, whereas the computation elements 566, 586 of the dot product engines 530, 580 of the second compute unit 555 may each include only a single two-state memristor, such that a single-bit weighting can be applied to inputs by the computation elements 566, 586 of the dot product engines of 560, 580 of the second compute unit 555. Thus, in this the embodiment the accuracy of the calculations performed by the first compute unit 505 is greater than the accuracy of the calculations performed by the second compute unit 555. Again, the above-described arrangement could be reversed, with a lower accuracy compute unit being used as the first compute unit 505 and a higher accuracy compute unit being used as the second compute unit 555.

Alternatively, the first and second compute units 505, 555 may be analog implementations whose dot product engines are different in function or structure, e.g. chosen between a memristor-based architecture or a switched-cap-based architecture or a floating-gate flash architecture or a programmed weight current source-based architecture. The selection of the particular architecture may be made to optimise area/power/accuracy. Different engines may enable appropriate trade-offs in power consumption, area, accuracy As discussed above, the first and second compute units 505, 555 may both be analog compute units, or may both be digital compute units. Alternatively, one of the first and second compute units 505, 555 may be an analog compute unit and the other may be a digital compute unit. For example, the first compute unit 505 may be a digital compute unit and the second compute unit 555 may be an analog compute unit. As will be appreciated by those skilled in the art, digital computation is less prone to errors than analog computation, as digital computation elements are less sensitive to noise than analog computation elements. However, in general digital computation elements consume more power than analog computation elements, and thus the use of large numbers of digital computation elements in a processing system implemented in an integrated circuit of, e.g., an edge device, is undesirable from a power management point of view. The use of a digital compute unit as the first compute unit 505 and an analog compute unit as the second compute unit 555 enables a balance to be struck between power consumption and computational accuracy. Of course, the above-described arrangement could be reversed, with an analog compute unit being used as the first compute unit 505 and a digital compute unit being used as the second compute unit 555. This might be particularly advantageous for example if the signal input X is received in an analog format.

Figure 6:
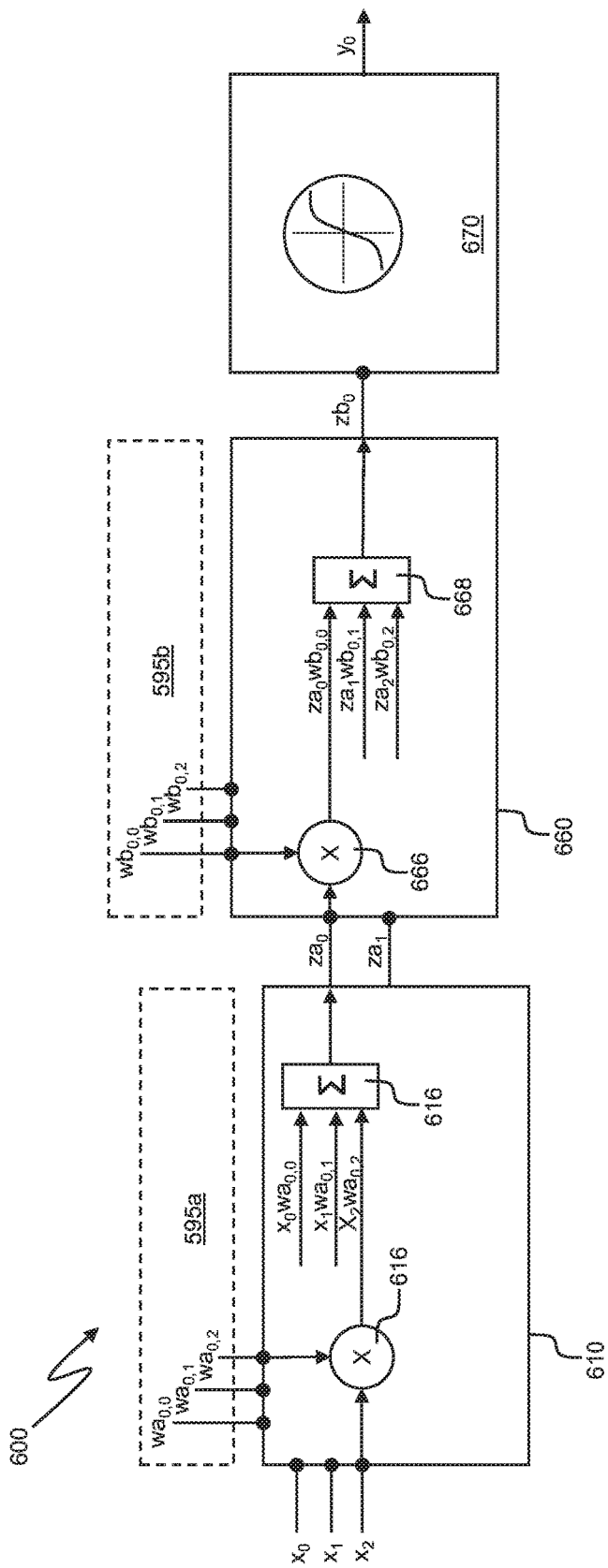
FIG. 6 is a schematic representation of a neuron for the ANN system of FIG. 5.

Although the ANN system 500 of FIG. 5 is described above as comprising first and second compute units, it will be appreciated that the ANN system 500 includes a plurality of individual neurons. FIG. 6 schematically illustrates a single neuron for use in the ANN system 500 of FIG. 5.

The neuron, shown generally at 600 in FIG. 6, includes a first dot product engine 610, a second dot product engine 660 of and an activation function unit 670. The structure and function of the first dot product engine 610 of the neuron 600 are similar to those of the first compute unit 505 of the ANN system 500 (which may include one or more individual dot product engines 510), whilst the structure and function of the second dot product engine 660 are similar to those of the dot product engine 560 of the ANN system 500 (such that a single neuron 600 the first dot product engine 610 may provide multiple intermediate output signals and the second dot product engine 660 provides a single output signal). The structure and function of the activation function unit 670 are similar to those of the activation function unit 570 of the ANN system 500.

As will be appreciated, when the neuron 600 is deployed in an ANN system of the kind shown in FIG. 5, the first dot product engine 610 can be used as the first dot product engine 510 of the first compute unit 505, the second dot product engine 660 can be used as the first dot product engine 560 of the second compute unit 555 and the activation function unit 670 can be used as the first activation function unit 570 of the second compute unit 555.

Thus, the first dot product engine 610 of the neuron 600 is configured to receive the input signals $x_0$, $x_1$, $x_2$ and the weight signals $wa_{0,0}$, $wa_{0,1}$, and $wa_{0,2}$ and, using its computation elements 616 and summation unit 618 as described above, calculate the dot product $za_0$ of the received input signals and weight signals. The dot product $za_0$ is output by the first dot product engine 610 to the second dot product engine 660, where it is used, in conjunction with dot products output by other dot product engines, to calculate a dot product output $zb_0$ of the second dot product engine 660, using the computation elements 666 and summation unit 668 of the second dot product engine 660 as described above. This dot product output $zb_0$ is received by the activation function unit 670, which performs a non-linear activation function to generate a neuron output $y_0$.

The first dot product engine 610 and the second dot product engine 660 of the neuron 600 are separate and distinct from each other, in the sense that the second dot product engine 660 is structurally or functionally different from the first dot product engine 610. For example, the first dot product engine 610 may be a digital dot product engine, in the sense that its computation elements 616 are digital computation elements, whilst the second dot product engine 660 may be an analog dot product engine, in the sense that its computation elements 666 are analog computation elements, in which case the first dot product engine 610 and the second dot product engine 660 are structurally different.

Additionally or alternatively, the first and second dot product engines 610, 660 of the neuron 600 may use different quantisation levels, in which case the first and second dot product engines 610, 660 are functionally different.

For example, if the first and second dot product engines 610, 660 are digital dot product engines, in the sense that their computation elements 616, 666 are digital computation elements, the resolution or bit-width of the computation elements 616 of the first dot product engine 610 may be different from the resolution or bit-width of the computation elements 666 of the second dot product engine 660.

In one embodiment the resolution or bit-width of the computation elements 616 of the first dot product engine 610 is greater than the resolution or bit-width of the computation elements 666 of the second dot product engine 660. Thus, in this embodiment the accuracy of the calculations performed by the first dot product engine 610 is greater than the accuracy of the calculations performed by the second dot product engine 660. The above-described arrangement could be reversed, however, with a lower accuracy dot product engine being used as the first dot product engine 610 and a higher accuracy dot product engine being used as the second dot product engine 660.

If the first and second dot product engines 610, 660 are analog dot product engines, in the sense that their computation elements 616, 666 are analog computation elements, the accuracy or resolution of the weights applied by the first dot product engine 610 may be different from the accuracy or resolution of the weights applied by the second dot product engine 660.

For example, the computation elements 616 of the first dot product engine 610 may be configured to apply a weight having a greater number of bits than the computation elements 666 of the second dot product engine 660. The computation elements 616 of the first dot product engine 610 may thus include multiple memristors, such that a multi-bit weighting can be applied to the input signals by the computation elements 616, whereas the computation elements 666 of the second dot product engine 660 may each include only a single memristor, such that a single-bit weighting can be applied to the inputs by the computation elements 666. Thus, in this embodiment the accuracy of the calculations performed by the first dot product engine 610 is greater than the accuracy of the calculations performed by the second dot product engine 660. Again, the above-described arrangement could be reversed, with a lower accuracy dot product engine being used as the first dot product engine 610 and a higher accuracy compute unit being used as the second dot product engine 660.

Alternatively, the first and second dot product engines 610, 660 may be analog implementations that are different in function or structure, e.g. chosen between a memristor-based architecture or a switched-cap-based architecture or a floating-gate flash architecture or a programmed weight current source-based architecture. The selection of the particular architecture may be made to optimise area/power/accuracy. Different engines may enable appropriate trade-offs in power consumption, area, accuracy As will be appreciated, where the first and second dot product engines 610, 660 are structurally different (e.g. one is an analog dot product engine and the other is a digital dot product engine), appropriate conversion of the dot product output signal of the first dot product engine 610 will be required in order for it to be usable by the second dot product engine 660.

Figure 7:
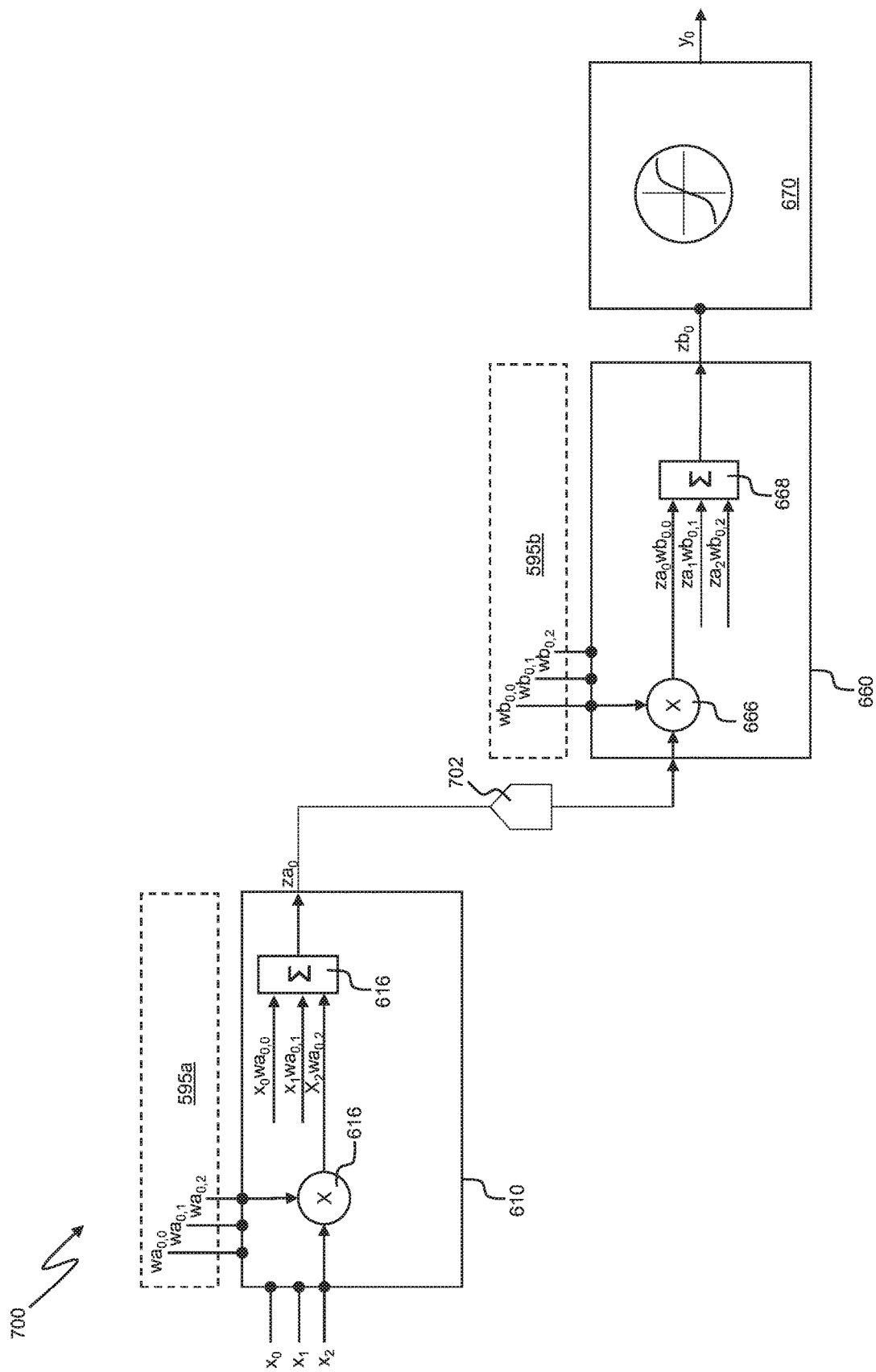
FIG. 7 is a schematic representation of an alternative neuron for the ANN system of FIG. 5.

FIG. 7 is a schematic representation of a neuron in which a first dot product engine is a digital dot product engine and a second dot product engine is an analog dot product engine. The neuron (shown generally at 700 in FIG. 7) is similar to the neuron 600 of FIG. 6, and thus like elements are denoted by like reference numerals.

The neuron 700 includes a digital to analog converter (DAC) 702 coupled between the output of the first (digital) dot product engine 610 and an input of the second (analog) dot product engine 660. Thus, the dot product $za_0$, which is output by the first dot product engine 610 in a digital form, is converted to an analog form that can be used by the second dot product engine 660.

Where a plurality of neurons 700 are used in an ANN system, a DAC 702 will be provided at the output of the first dot product engine 610 of each neuron. It will be further understood that individual DACs may be provided for each output of the first dot product engine 610.

Figure 8:
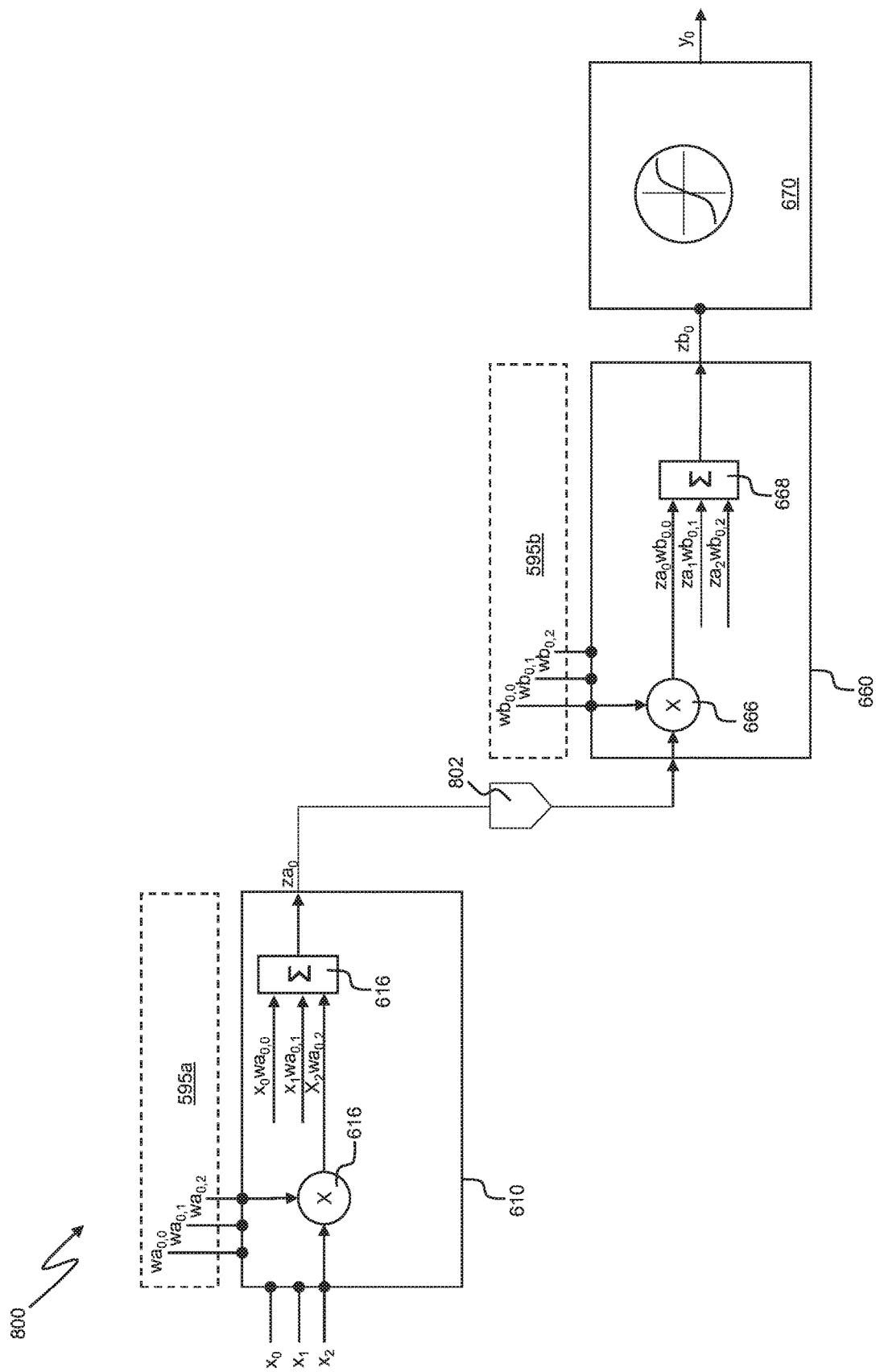
FIG. 8 is a schematic representation of an alternative neuron for the ANN system of FIG. 5.

FIG. 8 is a schematic representation of a neuron in which a first dot product engine is an analog dot product engine and a second dot product engine is a digital dot product engine. The neuron (shown generally at 800 in FIG. 8) is similar to the neuron 600 of FIG. 6, and thus like elements are denoted by like reference numerals.

The neuron 800 includes an analog to digital converter (ADC) 802 coupled between the output of the first (analog) dot product engine 610 and an input of the second (digital) dot product engine 660. Thus, the dot product $za_0$, which is output by the first dot product engine 610 in an analog form, is converted to a digital form that can be used by the second dot product engine 660.

Where a plurality of neurons 800 are used in an ANN system, an ADC 802 will be provided at the output of the first dot product engine 610 of each neuron. It will be further understood that an ADC may be provided for each output of the first dot product engine 610.

Figure 9:
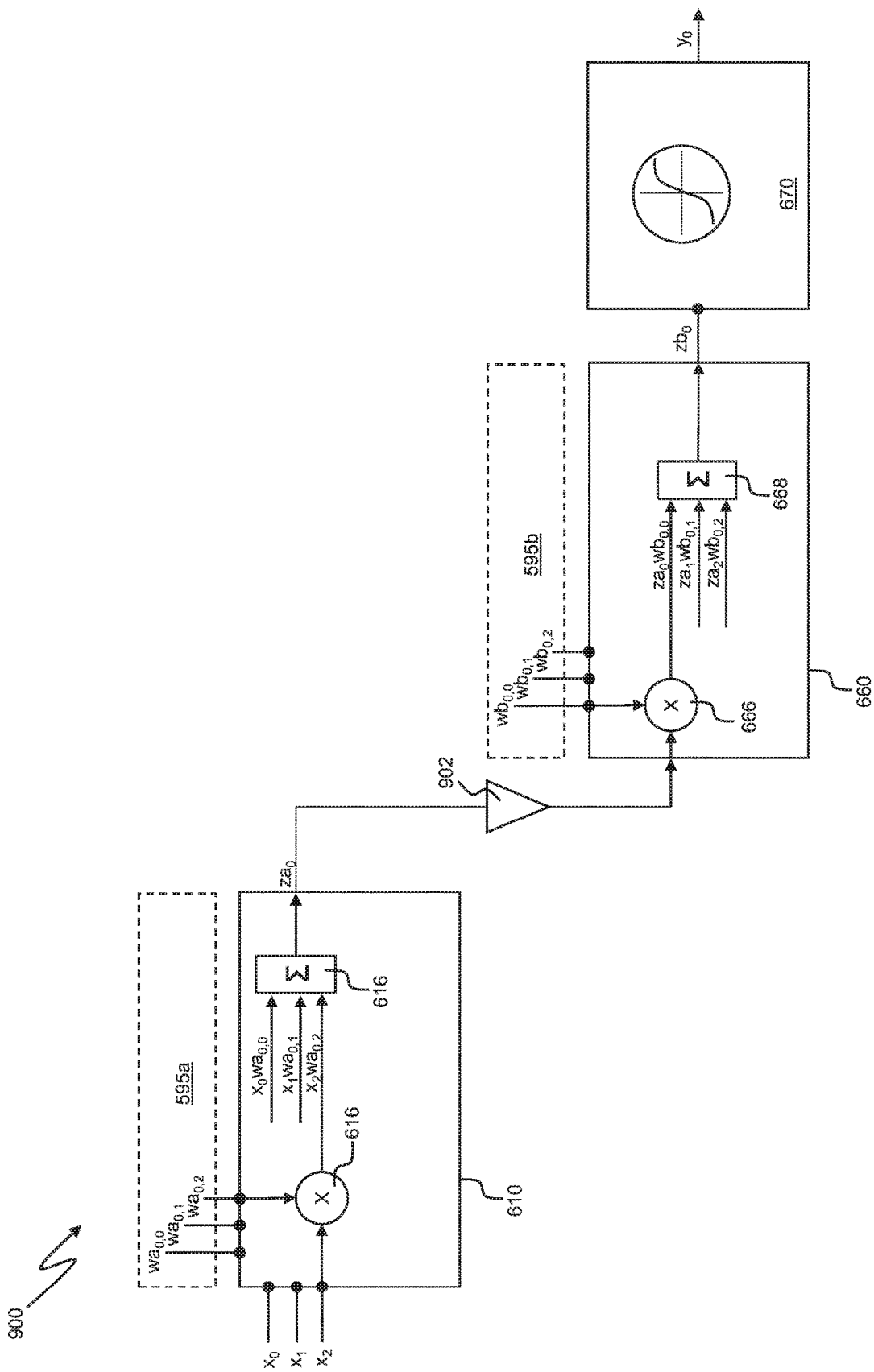
FIG. 9 is a schematic representation of an alternative neuron for the ANN system of FIG. 5.

FIG. 9 is a schematic representation of a neuron in which both the first dot product engine and the second dot product engine are analog dot product engines. The neuron (shown generally at 900 in FIG. 9) is similar to the neuron 600 of FIG. 6, and thus like elements are denoted by like reference numerals.

As both of the dot product engines 610, 660 are analog dot product engines, there is no need for any DAC or ADC between the output of the first dot product engine 610 and the input of the second dot product engine 660. However, the neuron 900 may include buffer circuitry 902 coupled between the output of the first dot product engine 610 and the input of the second dot product engine 660. The buffer circuitry 902 is configured to receive the output of the first dot product engine 610 and to output a buffered version of this received signal to the input of the second dot product engine 660. In this way, the buffer circuitry can compensate for any difference or variation in gain that may exist between the output of the first dot product engine 610 and the input of the second dot product engine 660.

Where a plurality of neurons 900 are used in an ANN system, buffer circuitry 902 will be provided at the output of the first dot product engine 610 of each neuron. It will be understood that the buffer circuitry 902 may comprise any suitable ADCs, DACs, cascodes, regulated cascodes, current-voltage converters, current conveyors, charge-to-voltage converters, charge-to-time converters, time encoding machines or modulators, or any suitable conversion or buffer circuitry.

As will be appreciated, analog dot product engines for use in the neuron 900 may be implemented in a variety of ways.

For example, an analog dot product engine may be operative to convert an input voltage to an output current. If both the first and second dot product engines of the neuron 900 convert input voltages to output currents, then a current to voltage converter will be required to convert the current output of the first dot product engine into a voltage suitable for use as an input to the second dot product engine.

Figure 10:
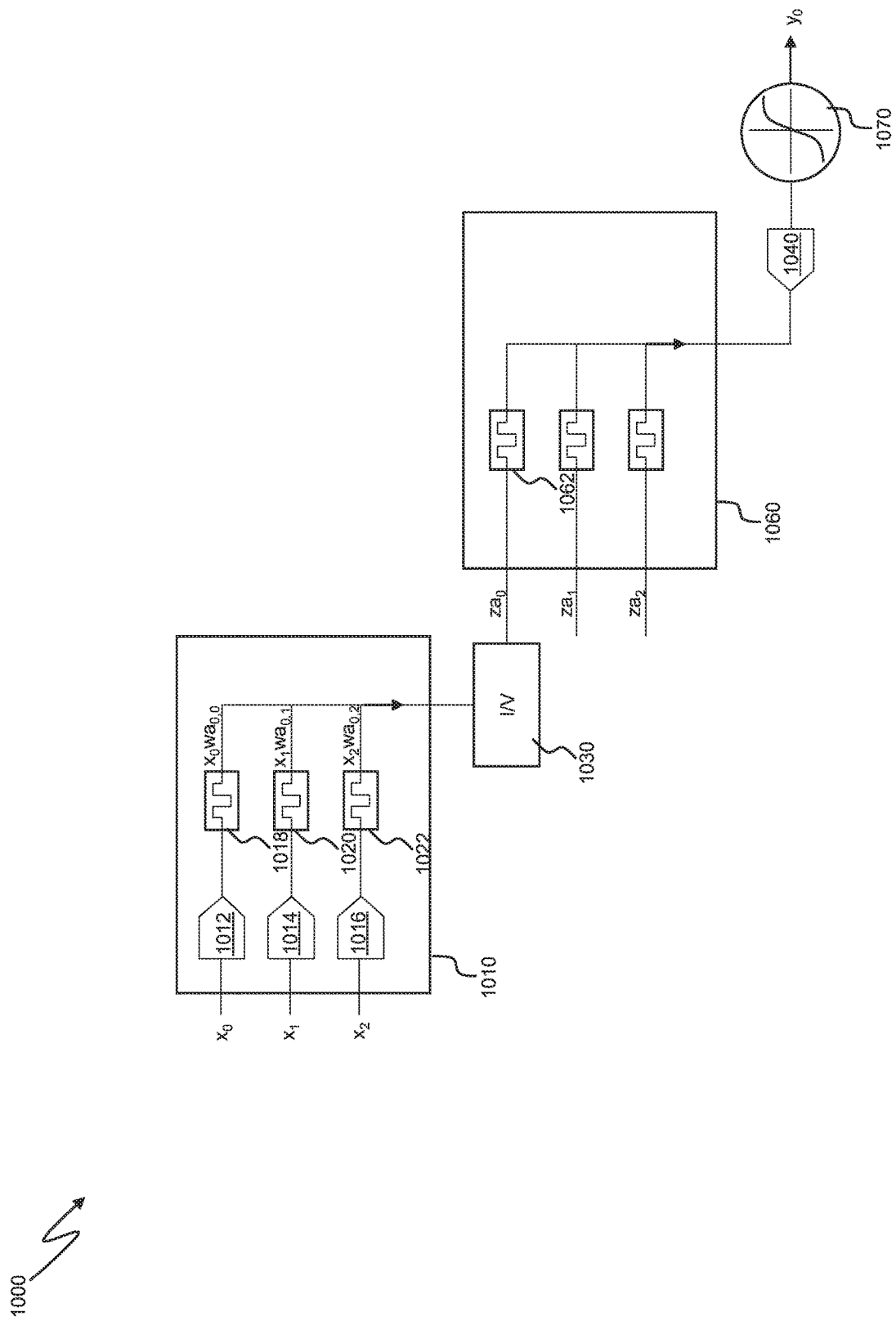
FIG. 10 is a schematic representation of an alternative neuron for the ANN system of FIG. 5.

FIG. 10 is a schematic representation of a neuron which uses first and second dot product engines that convert input voltages to output currents. The neuron (shown generally at 1000 in FIG. 10) includes a first analog dot product engine 1010, a second analog dot product engine 1060, a current to voltage converter 1040, an analog to digital converter 1040 and an activation function unit 1070.

The first dot product engine 1010 includes inputs for receiving digital input signals $x_0$, $x_1$, $x_2$, in the form of voltages. First, second and third DACs 1012, 1014, 1016 are operative to convert the received digital voltage signals into analog signals, and these analog output signals are input to respective first, second and third voltage to current converters 1018, 1020, 1022 which are configured to apply respective weights $wa_{0,0}$, $wa_{0,1}$, $wa_{0,2}$ to the input signals $x_0$, $x_1$, $x_2$. For example, the voltage to current converters 1018, 1020, 1022 may be pre-programed with the respective weights $wa_{0,0}$, $wa_{0,1}$, $wa_{0,2}$ to be applied to the input signals $x_0$, $x_1$, $x_2$.

The voltage to current converters 1018, 1020, 1022 are shown in FIG. 10 as memristors, but it is to be appreciated that each voltage to current converter could comprise, for example, a single memristor, a combination of two or more memristors arranged in series or parallel, a combination of one or more memristors and one or more resistors arranged in series or parallel, a single resistor coupled in series with a switch, a plurality of resistors arranged in series or parallel and coupled in series with a switch, or any other convenient voltage to current converter.

The current at the output of each voltage to current converter 1018, 1020, 1022 represents the product of the respective input signal $x_0$, $x_1$, $x_2$ and the respective weights $wa_{0,0}$, $wa_{0,1}$, $wa_{0,2}$. Thus, the current output by the first voltage to current converter 1018 represents the product $x_0 wa_{0,0}$, the current output by the second voltage to current converter 1020 represents the product $x_1 wa_{0,1}$, and the current output by the second voltage to current converter 1022 represents the product $x_2 wa_{0,2}$.

The outputs of the voltage to current converters 1018, 1020, 1022 are coupled to each other and to an output of the first dot product engine 1010. Thus, the currents output by the voltage to current converters 1018, 1020, 1022 combine such that the current at the output of the first dot product engine 1010 represents the sum of the products $x_0 wa_{0,0}$, $x_1 wa_{0,1}$ and $x_2 wa_{0,2}$, i.e. the dot product of the inputs $x_0$, $x_1$, $x_2$ and the weights $wa_{0,0}$, $wa_{0,1}$, $wa_{0,2}$.

This output current is input to the current to voltage converter 1030, which converts the current to a voltage $za_0$ representing the sum of the products $x_0 wa_{0,0}$, $x_1 wa_{0,1}$, and $x_2 wa_{0,2}$ The voltage $za_0$ is input to the second dot product engine 1060 where it is converted to a current by a first voltage to current converter 1062 (which may be any convenient voltage current converter as discussed above in relation to the voltage to current converters 1018, 1020, 1022 of the first dot product engine 1060). The current output by the first voltage to current converter 1062 is combined with currents from further voltage to current converters that receive input voltages from other dot product engines and output to the ADC 1040, which generates a digital output signal representing the combined currents.

This digital output signal is input to the activation function unit 1070, which performs a non-linear activation function as described above and outputs a neuron output $y_0$.

As will be appreciated by those skilled in the art, the current to voltage converter 1030 could be implemented in a variety of different ways. For example, a simple operational amplifier circuit with suitable negative feedback could be used.

Those skilled in the art will also appreciate that similar arrangements could be used where the first and second dot product engines 1010, 1060 are operative to convert input currents into an output voltage, in which case the current to voltage converter would be replaced by a suitable voltage to current converter.

Figure 11:
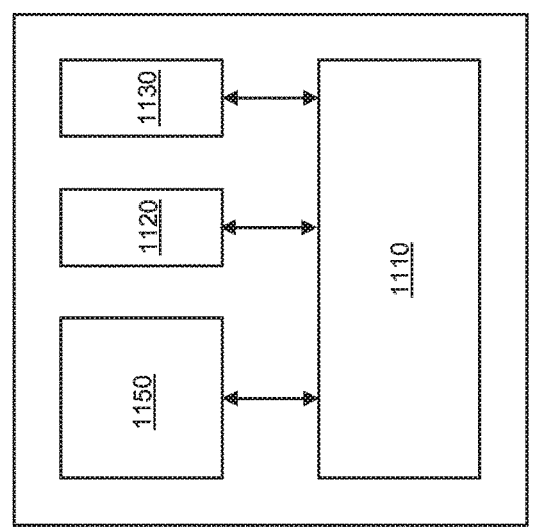
FIG. 11 is a schematic representation of a device incorporating a neuron or ANN system.

FIG. 11 is a schematic representation of a device in which a processing system of the kind described above may be provided. The device, shown generally at 1100 in FIG. 6, may be an edge device such as a mobile telephone, tablet or laptop computer, IoT device or the like. The device 1100 includes a processing unit 1110, embodied on one or more integrated circuits, which may be, for example, an application processor. The device further includes memory 1120 communicatively coupled to the processing unit 1110, and a communications subsystem 1130 which is also communicatively coupled to the processing unit 1110 to permit the device 1100 to communicate with systems and devices external to the device 600. The device further includes an integrated circuit 1150 that implements a neuron 600 or an ANN system 500, 700, 800, 900, 1000 of the kind described above with reference to FIGS. 5-10. The integrated circuit 1150 is communicatively coupled to the processing unit 1110 for receiving input data from and transmitting output data to the processing unit 1110.

As described above, the compute units 505, 555 receive weight values $wa_{0,0}$, $wa_{0,1}$, $wa_{0,2}$, $wa_{1,0}$, $wa_{1,1}$, $wa_{0,2}$ and $wb_{0,0}$, $wb_{0,1}$, $wb_{0,2}$, $wb_{1,0}$, $wb_{1,1}$, $wa_{0,2}$ belonging to first and second weight matrices $W_A$ and $W_B$ respectively. These weight values are derived from a matrix decomposition of a matrix W which represents the weights applied by the layer of the neural network being implemented by the processing system into the matrices $W_A$ and $W_B$ of weights to be applied by the compute units 505, 555.

The matrix W may be calculated at a central server or in the cloud, and the matrices $W_A$ and $W_B$ may also be calculated at the central server or in the cloud and their respective weights provided to the ANN system, 500, 600, 700, 800, 900, 1000 (e.g. by download to memory 595a, 595b and/or programming of computation elements 516, 536, 566, 586) during manufacture of a device 1100 incorporating the processing system or during a periodic or one-off update of the device 1100.

Figure 12:
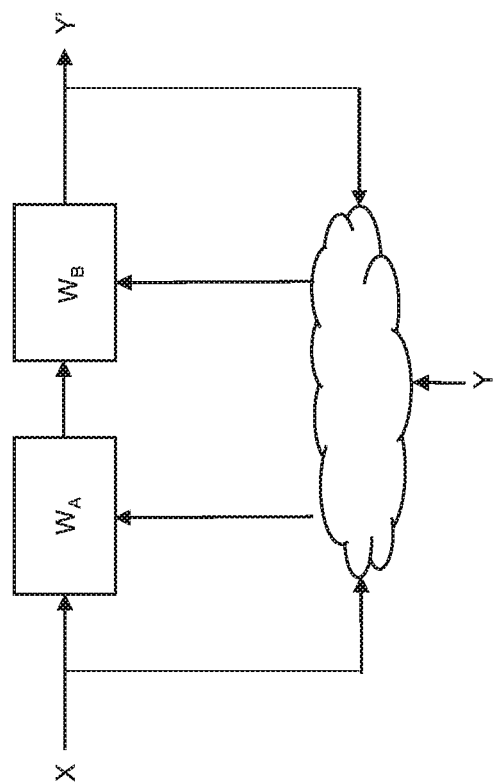
FIG. 12 conceptually illustrates a mechanism for learning weights for use by the ANN system of FIG. 5.

Alternatively, the weights of the matrix $W_A$ may calculated at a central server or in the cloud and may be provided to the ANN system 500, 600, 700, 800, 900, 1000 (e.g. by download to memory 595a, 595b and/or programming of computation elements 516, 536, 566, 586) during manufacture of a device 1100 incorporating the processing system or during a periodic or one-off update of the device 1100) during manufacture of a device 1100 incorporating the ANN system or during a periodic or one-off update of the device 1100 and the weights of the matrix $W_B$ may be computed or updated by the device 1000 itself, using a learning mechanism of the kind illustrated in FIG. 12. The weights of the matrix $W_B$ is calculated to minimise the error between the expected output Y and the actual output Y'.

While the above description refers to the processing of vectors and matrices, it will be understood that the invention may equally apply to the processing of multi-dimensional matrices or tensors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A neuron for an artificial neural network comprising:
   a first dot product engine operative to:
      receive a first set of weights;
      receive a set of inputs; and
      calculate the dot product of the set of inputs and the first set of weights to generate a first dot product engine output;
   a second dot product engine operative to:
      receive a second set of weights;
      receive an input based on the first dot product engine output; and
      generate a second dot product engine output based on the product of the first dot product engine output and a weight of the second set of weights; and
   an activation function module arranged to generate a neuron output based on the second dot product engine output,
   wherein the first dot product engine and the second dot product engine are structurally or functionally different.

2. A neuron according to claim 1 wherein the weights of the second set of weights have different quantisation than the weights of the first set of weights.

3. A neuron according to claim 2 wherein the weights of the first set of weights each have a different number of bits than the weights of the second set of weights.

4. A neuron according to claim 2 wherein the weights of the first set of weights each have a greater number of bits than the weights of the second set of weights.

5. A neuron according to claim 1 wherein a resolution or bit-width of the first dot product engine is different from a resolution or bit-width of the second dot product engine.

6. A neuron according to claim 1 wherein a resolution or bit-width of the first dot product engine is greater than a resolution or bit-width of the second dot product engine.

7. A neuron according to claim 1 wherein one of the first and second dot product engines is a digital dot product engine and the other of the first and second dot product engines is an analog dot product engine.

8. A neuron according to claim 1 wherein the first and second dot product engines are analog dot product engines.

9. A neuron according to claim 8 further comprising buffer circuitry operative to receive the first dot product engine output and to output a buffered signal to the second dot product engine.

10. A neuron according to claim 9 wherein the first and second dot product engines are operative to convert input voltage signals into output current signals, and wherein the buffer circuitry comprises a current to voltage converter.

11. A neuron according to claim 9 wherein the first and second dot product engines are operative to convert input current signals into voltage signals, and wherein the buffer circuitry comprises a voltage to current converter.

12. A neuron according to claim 1 further comprising one or more memories for storing the first and second sets of weights.

13. A neuron according to claim 1 wherein the first dot product engine or the second dot product engine comprises an array of non-volatile memory elements, for example flash memory, MRAM, RRAM, nanotubes, or any memristive element such as a memristor.

14. An artificial neural network system comprising a plurality of neurons according to claim 1.

15. An integrated circuit comprising a neuron or a plurality of neurons according to claim 1.

16. A device comprising an integrated circuit according to claim 15.

17. A device according to claim 16, wherein the device is a mobile telephone, a tablet or laptop computer or an Internet of Things (IoT) device.

18. An artificial neural network system for an artificial neural network comprising:
  a first compute unit operative to:
    receive a first set of weights derived from a matrix of weights for the artificial neural network;
    receive a set of inputs; and
    calculate a plurality of dot products of the set of inputs and subsets of the first set of weights to generate a set of first dot product outputs;
  a second compute unit operative to:
    receive a second set of weights derived from the matrix of weights for the artificial neural network;
    receive the set of first dot product outputs;
    calculate a plurality of dot products of the set of first dot product outputs and subsets of the second set of weights to generate a set of second dot product outputs;
  and
  a plurality of activation function units configured to apply a set of activation functions to the set of second dot product outputs to generate a set of ANN system outputs,
  wherein the first compute unit is structurally or functionally different from the second compute unit.

19. An artificial neural network system for an artificial neural network comprising:
  a first compute unit operative to:
    receive a first set of weights, each weight of the first set of weights having a first quantisation level;
    receive a set of inputs; and
    calculate a plurality of dot products of the set of inputs and subsets of the first set of weights to generate a set of first dot product outputs;
  a second compute unit operative to:
    receive a second set of weights, each weight of the first set of weights having a second quantisation level that is different than the first quantisation level;
    receive the set of first dot product outputs; and
    calculate a plurality of dot products of the set of first dot product outputs and the second set of weights to generate a set of second dot product outputs;
  and
  a plurality of activation function units configured to apply a set of activation functions to the set of second dot product outputs to generate a set of ANN system outputs.

20. An artificial neural network system for an artificial neural network comprising:
  a digital compute unit operative to:
    receive a first set of weights;
    receive a set of inputs; and
    calculate a plurality of dot products of the set of inputs and subsets of the first set of weights to generate a set of analog compute unit outputs;
  an analog compute unit operative to:
    receive a second set of weights;
    receive a set of digital compute unit outputs; and
    calculate a plurality of dot products of the set of digital compute unit outputs and the second set of weights to generate the set of analog compute unit outputs;
  and
  a plurality of activation function units configured to apply a set of activation functions to the set of analog dot product outputs to generate a set of ANN system outputs.

* * * * *

UNITED STATES PATENT AND TRADEMARK OFFICE
CERTIFICATE OF CORRECTION

PATENT NO. : 11,551,075 B2
APPLICATION NO. : 16/820921
DATED : January 10, 2023
INVENTOR(S) : John Paul Lesso It is certified that error appears in the above-identified patent and that said Letters Patent is hereby corrected as shown below:

In the Specification

1. In Column 1, Line 47, delete "table" and insert -- tablet --, therefor.

2. In Column 6, Line 11, delete "270" and insert -- 280 --, therefor.

3. In Column 6, Line 58, delete "240" and insert -- 250 --, therefor.

4. In Column 7, Line 21, delete "Y = WX" and insert -- Y = WX. --, therefor.

5. In Column 8, Line 59, delete "into", therefor.

6. In Column 9, Line 4, delete "size" and insert -- size. --, therefor.

7. In Column 11, Line 1, delete "560" and insert -- 580 --, therefor.

8. In Column 11, Line 59, delete "505" and insert -- 555 --, therefor.

9. In Column 13, Line 30, delete "engines of 510," and insert -- engines 510, --, therefor.

10. In Column 13, Line 30, delete "engines of 560," and insert -- engines 560, --, therefor.

11. In Column 13, Line 37, delete "in this the" and insert -- in this --, therefor.

12. In Column 13, Line 53, delete "area, accuracy" and insert -- area, and accuracy. --, therefor.

13. In Column 14, Line 20, delete "660 of" and insert -- 660 --, therefor.

14. In Column 15, Line 44, delete "in this the" and insert -- in this --, therefor.

Signed and Sealed this
Ninth Day of May, 2023

Katherine Kelly Vidal
*Director of the United States Patent and Trademark Office*

15. In Column 15, Line 60, delete "area, accuracy" and insert -- area, and accuracy. --, therefor.

16. In Column 17, Line 62, delete "1060" and insert -- 1010 --, therefor.

17. In Column 18, Line 27, delete "600" and insert -- 1100 --, therefor.

18. In Column 18, Line 58, delete "1100)" and insert -- 1100 --, therefor.